United States Patent
Davies et al.

(10) Patent No.: US 11,248,933 B2
(45) Date of Patent: Feb. 15, 2022

(54) SYSTEM AND METHOD FOR IDENTIFYING APPLIANCES UNDER RECALL

(71) Applicant: Green Running Limited, Bath (GB)

(72) Inventors: Peter Gareth Davies, London (GB); Conrad Spiteri, London (GB)

(73) Assignee: Green Running Limited, Bath (GB)

( * ) Notice: Subject to any disclaimer, the term of this patent is extended or adjusted under 35 U.S.C. 154(b) by 0 days.

(21) Appl. No.: 16/626,657

(22) PCT Filed: Jun. 27, 2018

(86) PCT No.: PCT/GB2018/051789
§ 371 (c)(1),
(2) Date: Dec. 26, 2019

(87) PCT Pub. No.: WO2019/002851
PCT Pub. Date: Jan. 3, 2019

(65) Prior Publication Data
US 2020/0225060 A1    Jul. 16, 2020

(30) Foreign Application Priority Data
Jun. 27, 2017 (GB) ...................................... 1710244

(51) Int. Cl.
*G01D 4/00* (2006.01)
*G01D 4/02* (2006.01)
(Continued)

(52) U.S. Cl.
CPC ............... *G01D 4/002* (2013.01); *G01D 4/02* (2013.01); *G01D 4/10* (2013.01); *G06Q 50/06* (2013.01)

(58) Field of Classification Search
CPC ........... G01D 4/002; G01D 4/02; G01D 4/10; G06Q 50/06
See application file for complete search history.

(56) References Cited

U.S. PATENT DOCUMENTS 9,542,510 B2   1/2017  Fei
2007/0021964 A1*  1/2007  Maenishi ............. G06K 7/0008
705/303
(Continued)

FOREIGN PATENT DOCUMENTS

GB         2475172 A     5/2011
WO   WO 2011/058328 A2   5/2011
(Continued)

OTHER PUBLICATIONS

International Search Report for International Application No. PCT/GB2018/051789, dated Oct. 24, 2018 (3 pages).
(Continued)

*Primary Examiner* — Franklin D Balseca
(74) *Attorney, Agent, or Firm* — Nixon Peabody LLP

(57) ABSTRACT

An appliance operation signal processing system comprises:
an input for receiving an appliance operation signal, the appliance operation signal comprising information relating to operation of an appliance;
an output for outputting information relating to a recall status of the appliance; and
a processor configured to:
monitor an input appliance operation signal for a change in magnitude;
if a change is detected:
identify a component event corresponding to the change;
determine whether the component event is a designated sequence start component event;
if the component event is determined to be a designated sequence start component event:
extract one or more features from the input appliance operation signal between the sequence start component event and a sequence stop point;
(Continued)

determine information relating to a recall status of the appliance by inputting the one or more features into a first algorithm.

13 Claims, 10 Drawing Sheets

(51) Int. Cl.
  *G01D 4/10* (2006.01)
  *G06Q 50/06* (2012.01)

(56) References Cited

U.S. PATENT DOCUMENTS

| | | | |
|---|---|---|---|
| 2009/0204415 A1* | 8/2009 | Baiera | G06Q 30/014 705/303 |
| 2017/0039574 A1 | 2/2017 | Koerber | |
| 2017/0235290 A1 | 8/2017 | Weber | |
| 2018/0253733 A1* | 9/2018 | Lewis | H04L 51/10 |

FOREIGN PATENT DOCUMENTS

| | | |
|---|---|---|
| WO | WO 2011/129715 A2 | 10/2011 |
| WO | WO 2011/139715 A2 | 11/2011 |
| WO | WO 2012/065078 A2 | 5/2012 |

OTHER PUBLICATIONS

Written Opinion of International Searching Authority for International Application No. PCT/GB2018/051789, dated Oct. 24, 2018 (8 pages).

Examination Report in European Patent Application No. EP 18 739 585.0, dated Oct. 12, 2020 (5 pages).

Search Report in Great Britain Patent Application No. GB 1710244. 3, dated Oct. 25, 2017 (5 pages).

* cited by examiner

| Time Start (ms) | Time Stop (ms) | Component | Feature list |
|---|---|---|---|
| 0 | 671 | Door lock | [$V_{(hm1)}$, $V_{(hm2)}$........, $V_{(hmn)}$, $A_{(hm1)}$, $A_{(hm2)}$........, $A_{(hmn)}$, $P_{(Real)(hm1)}$,........, $P_{(Real)(hmn)}$, $P_{(app)(hm1)}$,........, $P_{(app)(hmn)}$,........ etc.] |
| 8,284 | 217,351 | Water valve open | [feature vector] |
| 68,452 | 73,457 | Drum rotation | [feature vector] |
| 78,469 | 83,472 | Drum rotation | [feature vector] |
| ... | ... | ... | ... etc |

SYSTEM AND METHOD FOR IDENTIFYING APPLIANCES UNDER RECALL

CROSS-REFERENCE TO RELATED APPLICATIONS

This application is a national stage of Application No. PCT/GB2018/051789 filed Jun. 27, 2018, and claims the benefit of priority from United Kingdom Application number 1710244.3 filed on Jun. 27, 2017, which are both incorporated by reference in their entireties.

FIELD

The present invention relates to a system and method for identifying appliances under recall.

BACKGROUND

Numerous power-monitoring devices are available. Such devices may provide information relating to the power consumption of one or more appliances for example.

It is desirable to identify whether an appliance is being recalled, for various reasons.

BRIEF DESCRIPTION OF THE DRAWINGS

For a more complete understanding, reference is made to the following description and accompanying drawings, in which.

DETAILED DESCRIPTION

Figures 1, 2:
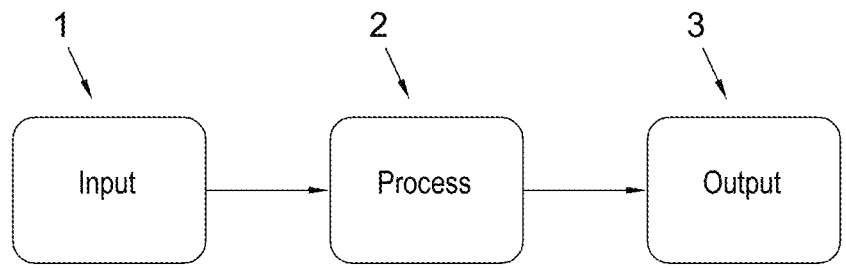
FIG. 1 is a flow chart showing an input, processing step and output of a method used by the algorithm in accordance with an embodiment.
FIG. 2 shows part of an example feature vector for a washing machine.

According to an embodiment, there is provided an appliance operation signal processing system comprising:
an input for receiving an appliance operation signal, the appliance operation signal comprising information relating to operation of an appliance;
an output for outputting information relating to a recall status of the appliance; and
a processor configured to:
  monitor an input appliance operation signal for a change in magnitude;
  if a change is detected:
    identify a component event corresponding to the change;
    determine whether the component event is a designated sequence start component event;
    if the component event is determined to be a designated sequence start component event:
      extract one or more features from the input appliance operation signal between the sequence start component event and a sequence stop point;
      determine information relating to a recall status of the appliance by inputting the one or more features into a first algorithm.

In an embodiment, determining the information relating to a recall status of the appliance comprises determining a probability that the appliance corresponds to an appliance model designated as recalled, by applying a first classifier to a feature vector comprising the one or more features. The first classifier may be a machine learning classifier. In an embodiment, the first classifier is further configured to determine a probability that the appliance corresponds to each of a set of appliance models having a failed component, wherein the appliance model is designated as recalled if the component has failed.

In an embodiment, the processor is further configured to, if the component event is determined to be a designated sequence start component event:
  monitor the input appliance operation signal for further changes in magnitude;
  identify component events corresponding to detected changes;
  wherein extracting the one or more features comprises extracting time location information, relative to the sequence start component event, for each identified component event and wherein the feature vector comprises the identified component events and the corresponding time location information.

The time location information may be relative to a start time of the sequence start component event, and wherein for each identified component event, the feature vector comprises a start time of the component event and a stop time of the component event.

In an embodiment, the first classifier is configured to determine a probability that the appliance corresponds to each of a set of appliance models designated as recalled. The processor may be further configured to normalise the probabilities. In an embodiment the processor is further configured to determine the probability with the highest value, and determine whether the probability with the highest value is greater than a threshold value, wherein if the probability with the highest value is greater than the threshold value, the appliance is identified as corresponding to an appliance model designated as recalled.

In an embodiment, extracting the one or more features further comprises, for each component event:
  extracting a first section of the input signal, the first section being a section of the signal from a location prior to the start time to a location after the start time and before the end time;
  extracting a pre-component event portion of the first section, the pre-component event portion being at least a part of the first section of the signal prior to the start time;

extracting a post-component event portion of the first section, the post-component event portion being at least a part of the first section of the signal after the start time;

transforming each of the pre-component event portion and the post-component event portion into the frequency domain;

subtracting the frequency domain pre-component event portion from the frequency domain post-component event portion to give a resultant frequency spectrum, wherein the feature vector further comprises information relating to the resultant frequency spectrum for each component event.

Transforming the signal into the frequency domain may comprise using a fast Fourier transform. The signal may be a current signal, voltage signal and/or power signal for example.

The information relating to the resultant frequency spectrum may comprise the amplitude value corresponding to a plurality of harmonic frequencies, wherein the harmonic frequencies are the positive integer multiples of the fundamental frequency of the appliance operation signal.

In an embodiment, extracting the one or more features comprises, for each component event:
extracting a first section of the input signal, the first section being a section of the signal from a location prior to the start time to a location after the start time and before the end time;
extracting a pre-component event portion of the first section, the pre-component event portion being at least a part of the first section of the signal prior to the start time;
extracting a post-component event portion of the first section, the post-component event portion being at least a part of the first section of the signal after the start time;
subtracting the time domain pre-component event portion from the time domain post-component event portion to give a resultant time domain signal, wherein the feature vector further comprises information relating to the resultant time domain signal for each component event.

The location prior to the start time and the location after the start time may be a fixed duration before and after the start time.

Monitoring the input appliance operation signal for a change in magnitude may comprise monitoring for a change in magnitude greater than a threshold value.

In an embodiment, identifying a component event corresponding to the change comprises extracting one or more features from the input appliance operation signal and inputting the one or more features into a second algorithm.

Inputting the one or more features into a second algorithm may comprise applying a second classifier to the one or more features. The second classifier may be configured to determine a probability that the change corresponds to each of a set of component events corresponding to the appliance category type and the component event is identified as that with the highest probability.

One or more of the features extracted for input to the second algorithm may be the same as those inputted to the first algorithm.

Determining whether the component event is a designated sequence start component event may comprise determining whether the component event corresponds to a stored designated sequence start component event for the appliance category type.

In an embodiment, the sequence stop point is a fixed time period after the designated sequence start component event.

In an embodiment, the processor is further configured to determine whether the component event is a designated stop component event, wherein the sequence stop point corresponds to the time location of a designated stop component event.

In an embodiment, the appliance operation signal comprises a utility consumption signal. In an embodiment the appliance consumes electrical power, and wherein the appliance operation signal comprises an electrical current signal and/or an electrical voltage signal and/or an electrical power signal. In an embodiment, the appliance operation signal comprises an electrical power signal having a fundamental frequency of 50 Hz or 60 Hz. In an embodiment, the appliance operation signal is a continuously sampled time domain signal, wherein the sampling frequency is at least 50 Hz or at least 60 Hz.

In an embodiment, the appliance consumes water and the appliance operation signal comprises a water consumption signal. In an embodiment, the appliance consumes gas and wherein the appliance operation signal comprises a gas consumption signal.

In an embodiment, the appliance operation signal comprises an auditory signal and/or a vibratory signal.

In an embodiment, the appliance operation signal comprises information relating to operation of a plurality of appliances, and the processor is further configured to:
if a change is detected, identify an appliance category type corresponding to the change. The appliance category type may be washing machine, dishwasher, etc.

In an embodiment, the system comprises an electrical power disaggregation system configured to connect to the mains electricity supply of a premises. In an embodiment, the system comprises a power plug for coupling an electrical appliance to an electrical power supply.

The input may be a receiver configured to receive the utility operation signal over a wired or wireless connection.

In an embodiment, the output comprises a transmitter and the outputted recall status is transmitted over a wired or wireless connection. In an embodiment, the output comprises a display and the outputted recall status is displayed on the display.

According to another embodiment, there is provided an appliance operation signal processing system comprising:
an input for receiving an appliance operation signal, the appliance operation signal comprising information relating to operation of an appliance;
an output for outputting information relating to the model of the appliance; and
a processor configured to:
monitor an input appliance operation signal for a change in magnitude;
if a change is detected:
identify a component event corresponding to the change;
determine whether the component event is a designated sequence start component event;
if the component event is determined to be a designated sequence start component event:
extract one or more features from the input appliance operation signal between the sequence start component event and a sequence stop point;
determine information relating to the model of the appliance by inputting the one or more features into a first algorithm.

According to another embodiment, there is provided an appliance operation signal processing method comprising:
- receiving an appliance operation signal, the appliance operation signal comprising information relating to operation of an appliance;
- monitoring an input appliance operation signal for a change in magnitude;
- if a change is detected:
  - identifying a component event corresponding to the change;
  - determining whether the component event is a designated sequence start component event;
  - if the component event is determined to be a designated sequence start component event:
    - extracting one or more features from the input appliance operation signal between the sequence start component event and a sequence stop point;
    - determining information relating to a recall status of the appliance by inputting the one or more features into a first algorithm;
    - outputting information relating to a recall status of the appliance.

In an embodiment, determining the information relating to a recall status of the appliance comprises determining a probability that the appliance corresponds to an appliance model designated as recalled, by applying a first classifier to a feature vector comprising the one or more features.

According to another embodiment, there is provided an appliance operation signal processing method comprising:
- receiving an appliance operation signal, the appliance operation signal comprising information relating to operation of an appliance;
- monitoring an input appliance operation signal for a change in magnitude;
- if a change is detected:
  - identifying a component event corresponding to the change;
  - determining whether the component event is a designated sequence start component event;
  - if the component event is determined to be a designated sequence start component event:
    - extracting one or more features from the input appliance operation signal between the sequence start component event and a sequence stop point;
    - determining information relating to the model of the appliance by inputting the one or more features into a first algorithm;
    - outputting information relating to the model of the appliance.

According to another embodiment, there is provided a method of training a first algorithm to determine information relating to a recall status of an appliance, using a corpus of data comprising appliance operation signals each comprising information relating to operation of an appliance and each annotated with information relating to whether the appliance corresponds to an appliance model designated as recalled, the corpus comprising signals from a set of appliance models designated as recalled and from appliance models not designated as recalled, the method comprising:
- for each appliance operation signal, monitoring for a change in magnitude;
- if a change is detected:
  - identifying a component event corresponding to the change;
  - determining whether the component event is a designated sequence start component event;
  - if the component event is determined to be a designated sequence start component event:
    - extracting one or more features from the input appliance operation signal between the sequence start component event and a sequence stop point;
    - determining information relating to a recall status of the appliance by inputting the one or more features into a first algorithm;
  - training the first algorithm using the annotations.

The first algorithm may be a machine learning classifier. The information relating to a recall status of an appliance may comprise a probability that an appliance corresponds to each of a set of appliance models designated as recalled. Determining information relating to a recall status of the appliance by inputting the one or more features into a first algorithm may comprise determining a probability that the appliance corresponds to each of the set of appliance models designated as recalled, by applying the machine learning classifier to a feature vector comprising the one or more features.

In an embodiment, the corpus of data further comprises signals from appliance models having a failed component, wherein the appliance model is designated as recalled if the component has failed, and the appliance models not having the failed component, each annotated with information relating to whether the appliance corresponds to an appliance model having a failed component and is designated as recalled.

According to another embodiment, there is provided a method of training a first algorithm to determine information relating to the model of an appliance, using a corpus of data comprising appliance operation signals each comprising information relating to operation of an appliance and each annotated with information relating to the appliance model, the method comprising:
- for each appliance operation signal, monitoring for a change in magnitude;
- if a change is detected:
  - identifying a component event corresponding to the change;
  - determining whether the component event is a designated sequence start component event;
  - if the component event is determined to be a designated sequence start component event:
    - extracting one or more features from the input appliance operation signal between the sequence start component event and a sequence stop point;
    - determining information relating to the model of the appliance by inputting the one or more features into a first algorithm;
  - training the first algorithm using the annotations.

According to another embodiment, there is provided a system trained according to any of the above methods.

According to another embodiment, there is provided a method of annotating a corpus of data comprising appliance operation signals each comprising information relating to operation of an appliance with information relating to whether the appliance corresponds to an appliance model designated as recalled.

The methods are computer-implemented methods. Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium.

According to another embodiment, there is provided a carrier medium comprising computer readable code configured to cause a computer to perform any of the above described methods.

According to an embodiment, there is provided a method for identifying appliances operating within a premises which are being recalled by the manufacturer and/or regulating body due to design, manufacturing, component and/or other defects.

In an embodiment, a system is configured to distinguish whether an appliance is being recalled.

In an embodiment, the method identifies the energy consumption pattern, optionally including the elevated harmonics and/or transients generated by the appliance, and employs Machine Learning methods to identify whether its profile is similar or the same as an appliance within a recall list. This may be referred to as a 'positive match'.

Subsequently, if the appliance is determined to be a positive match, the user, owner and/or maintenance personnel are notified for example.

In an embodiment, the method is capable of determining the category type of appliance (for example whether it is a washing machine as opposed to a kettle). In an embodiment, the method is able to determine whether the appliance signature corresponds to a specific model that is under recall.

In an embodiment, the method is capable of determining the category type of appliance, and is able to determine whether the appliance signature corresponds to a specific model that is under recall. Furthermore the method may be able to determine and distinguish between two similar type of appliances, of different makes and/or models, within the same premises for example. By way of example only, if the premises has 2 washing machines of the same or different make and/or model, the method is able to distinguish between the two.

The average success rate of an electrical product recall in the UK is just 10-20%. This means that there are potentially millions of recalled electrical items still in UK homes. As most of these products have been recalled because they offer a risk of electric shock or electrical fire, they present a serious risk.

According to an embodiment, there is provided a method for identifying appliances which have been recalled by the manufacturer and/or regulating body due to design, manufacturing, component and/or other defects when operating in a domestic or commercial environment, through detailed analysis of the appliance energy consumption patterns, optionally with the harmonics and transients.

In particular, referring to FIG. 1, there is provided a method that monitors the energy profile of an appliance, for example in both the time and frequency domain. The energy profile (the terms 'profile', 'signature' and 'pattern' may be used interchangeably through this document having the same meaning) which is the input 1 of the algorithm, is subsequently compared to energy profiles of appliances in the recall list in step 2. FIG. 1 shows the input, processing and output method used by the algorithm.

The recall list contains various profiles of numerous appliance makes and models, as well as heating, ventilation and air conditioning units (HVAC) for example, that have been extensively tested and profiled in a laboratory. The recall list may also contain conditional recall information, where the failure of a specific component or a plurality of components may trigger a recall process. By way of example only, the failure of a valve within a washing machine may cause another component to become unstable. In such cases a manufacturer and/or regulating body may wish to recall appliances where such component has failed and might not wish to recall appliances where such component failure has not occurred.

The output of the processing stage 2 is a probability match to each appliance in the recall list. For example, the output stage 3 processes the probabilities from the processing stage 2 to produce a binary result of whether the appliance under test is part of the recall list.

Figure 3:
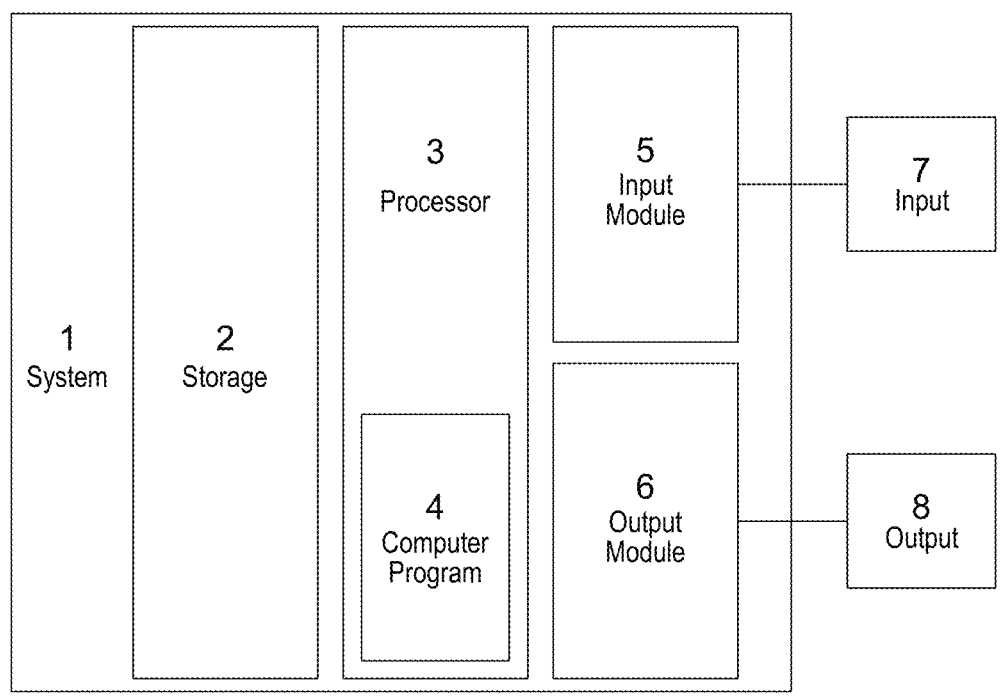
FIG. 3 shows a schematic illustration of a system for processing data to determine if an appliance is under recall in accordance with an embodiment.

FIG. 3 is a schematic illustration of a system for processing data to determine if an appliance is under recall, in accordance with an embodiment. The system 1 comprises a processor 3 which takes an input signal or input data relating to an appliance and outputs information relating to a recall status of the appliance, for example a binary decision indicating whether the appliance under test matches an appliance within the recall list. A computer program 4 is stored in non-volatile memory. The non-volatile memory is accessed by the processor and the stored code is retrieved and executed by the processor 3. The processor 3 may comprise logic circuitry that responds to and processes the instructions in the stored code. The storage 2 stores data that is used by the program 4.

The system 1 further comprises an input module 5 and an output module 6. The input module 5 is connected to an input 7 for receiving the data, for example from an external storage medium or a network. Alternatively, the input 7 may comprise hardware for sampling the voltage and current consumption as described below. The input 7 may include an additional current input for one or more of a solar PV installation and/or a home battery storage unit for example.

Connected to the output module 6 is output 8. The output 8 may be an interface that displays data to the user, for example a screen. Alternatively, the output may be a transmitter for transmitting data to an external storage medium, a network or any other device whether connected to the local network or part of a wider infrastructure such as a cloud system on the internet.

In an embodiment, the components of the system 1 may be located in a common system with hardware for inputting and outputting data. Alternatively, the system 1 may be a remote system 1, which receives and transmits data. For example, the system may be implemented on a cloud computing system, which receives and transmits data. Although in the described system, a single processor 3 located in a device is used, the system may comprise two or more remotely located processors configured to perform different parts of the processing and transmit data between them for example.

In use, the system 1 receives data through data input 7. The program 4, executed on processor 3, outputs information relating to a recall status of the appliance, for example a binary result of whether the appliance under test is part of the recall list.

During implementation, it is determined whether an event has occurred as described below. The event is identified by means of a second classifier and labelled accordingly. The vectorised feature vectors are passed to another, first, classifier program running on the processor 3 and being part of computer program 4. The output of the first classifier is a probability of the appliance under test matching each one of the appliances in the recall list. During implementation, the probabilities may be normalized and compared to each other by the same program running on the processor 3 and being part of computer program 4. The resultant highest value may be compared to a threshold value for example to produce a binary output, with a decision on whether the appliance under test is present within the recall list or not.

In an embodiment, the method is designed to operate at various levels and conditions. By way of example only, the method could operate in a device that is directly connected to the appliance such as a sub-metering device, energy monitor or a smart plug.

Equally and by way of another example only, the method could operate in a device that is connected to the main electricity supply of a premises (the term 'premises' refers to any building or structure which can house appliances whether domestic, commercial or otherwise and has a means to acquire or generate electricity), which performs dis-aggregation of the appliance's electrical consumption from the overall premises electricity consumption. An example of such a device is described in GB2475172A published on May 11 2011 and incorporated herein by reference. The dis-aggregated data may be used to identify an appliance.

The disaggregation may be a pre-processing step. Once it is determined that an appliance has turned on and it has been classified (disaggregated) as an appliance that falls into the same category as an appliance under recall, the feature vector is extracted and inserted into a table such as that depicted in FIG. 2 for example. Disaggregation detects classifies and labels a particular appliance. Event detection is then performed to detect a portion of the signal and populate a feature vector.

Similarly the system could, by way of another example only, be connected to the 3 phase supply of a premises or the 3 phase inlet of an appliance, where the device would perform the analysis on all 3 phases in a similar manner to a single phase supply.

In another embodiment by way of example only, the algorithm could operate on a cloud system, where a device sends or streams the voltage and current of a premises and/or appliance. The data may be at any sampling rate required to perform the operation as described below. The algorithm may analyse the data, determine whether the appliance signature matches any appliances within the recall list and communicate the decision back to the same device and/or the user, owner and/or maintenance personnel of the device under recall.

More specifically, the method may analyse the current and/or voltage being consumed by an appliance which is sampled by means of e.g. a current sensor and/or a voltage sensor that read the real-time voltage and current at a sampling rate of up to 10 MHz for example. The current and/or voltage sensors may be located at the electric source of the appliance or the main electricity source of the premises. The latter may require a pre-processing step of dis-aggregating the current and/or voltage portion pertaining to the appliance which is in turn supplied to the algorithm in the form of raw data at the data acquisition stage.

Figure 4A:
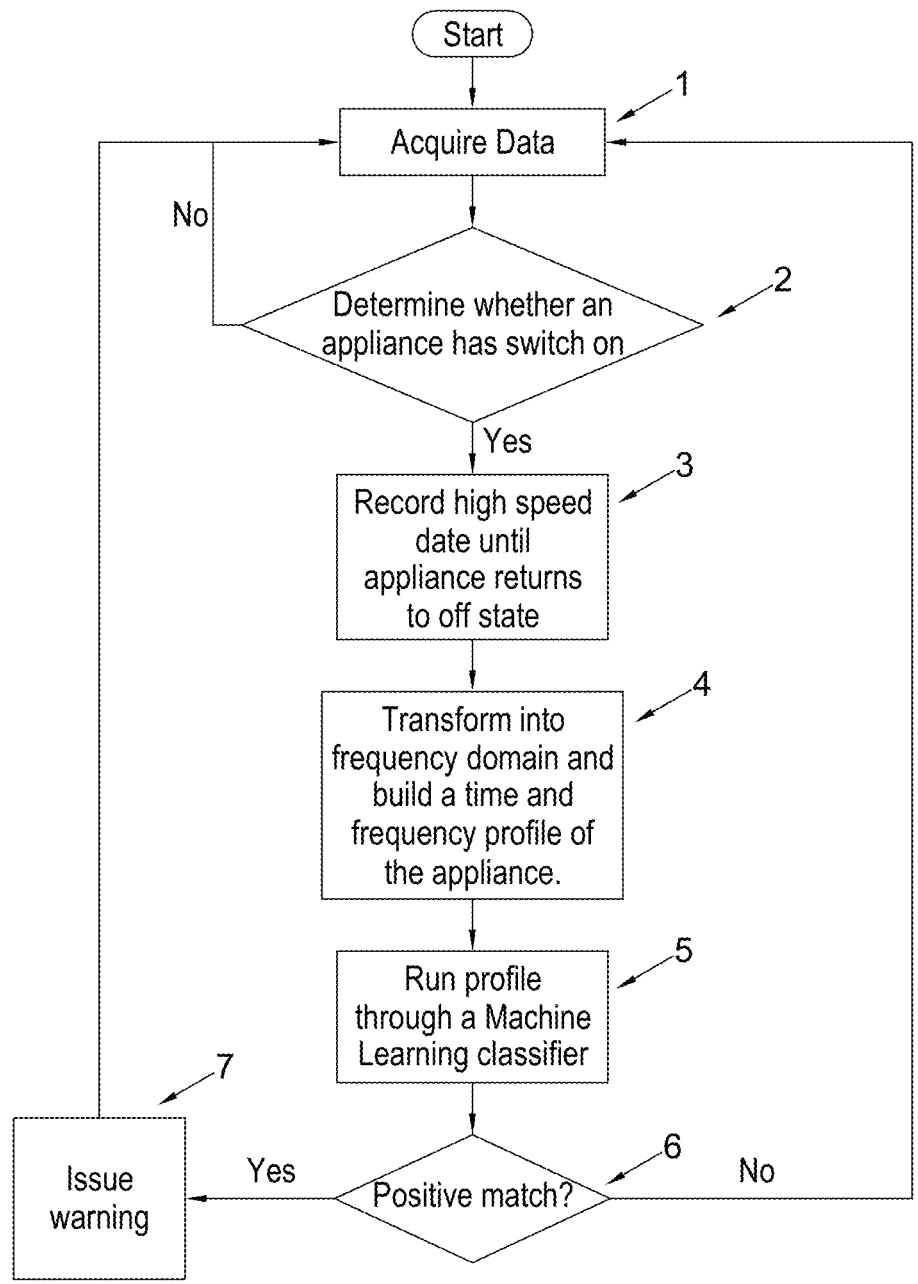
FIG. 4(a) shows a flowchart of an algorithm that detects and classifies appliances under recall in accordance with an embodiment.

FIG. 4(a) shows a flowchart of an algorithm for detecting and classifying appliances under recall according to an embodiment. Referring to FIG. 4(a), in step S1 the method acquires data from the current and/or voltage sensors at periodic intervals i.e. the sampling frequency. The interval duration is dependent on the capabilities of the processor and system that the algorithm is deployed onto for example.

In step S2 the data is crudely analysed to determine whether further processing is required. The analysis performed in step S2 may comprise a determination of whether a change has occurred in the power consumption of the appliance or its harmonics for example. This change is hereafter referred to as an 'event'. A simple step detection may be used to find abrupt changes in the utility signal, which are extracted as events for example. For example, a section of the signal is extracted, the section comprising the identified event, and for example 500 milliseconds either side of the event.

In some cases, the abrupt change in power is a simple and effective indication of an event, however in other cases the change is more complex, such as, by way of example only, containing ramps, switchbacks, flat areas within the transition or an abrupt change in the phase angle between the current and the voltage, that is, an abrupt change in the real power consumption. Any of these may additionally or alternatively be used to indicate an event. These complex events may (i) be caused by single individual devices such as microwaves, dryers and washing machines whose state transitions are often complicated or (ii) be caused by more than one device happening to change state within the duration that the event was recorded for example.

In addition, there may be instances where an appliance or component within an appliance switches off at the same time as another appliance (or component within a different or the same appliance) switches on and draws the same or similar power. In such cases the algorithm may not be able to detect an event based on an abrupt change in power consumption, however the harmonics of the power draw from one appliance to the other (or one or a plurality of components to others) would change. Therefore a change in the harmonics can also constitute an event.

Each event may be presented to a second classifier for identification. For example when the washing machine door is locked, the leading edge of the power consumption and harmonics are vectorised and presented to the second classifier. This is subsequently identified as the 'door lock start'. The trailing edge of the power consumption and harmonics are vectorised and presented to the second classifier. This is subsequently identified as the 'door lock end'. The door lock start and end are then logged into the feature vector table as detailed in FIG. 2 for example.

In an effort to remove unwanted background noise, pre-event power levels and/or harmonics may be subtracted from the post event data. A portion of the extracted event section prior to the identified event is extracted. This is the pre-event portion. A portion of the extracted event section after the identified event is extracted. This is the post event potion. To achieve the subtraction, the pre-event current and voltage signal are converted into the frequency domain using a Fast Fourier Transform (FFT) algorithm and the post event current and voltage signal are converted into the frequency domain using the same FFT. The resultant peaks of the pre-event are subtracted from the post event peaks.

For example the pre-event portion of the current and voltage and the post-event portion of the current and voltage may be inputted into an FTT algorithm, where the fundamental frequency is 50 Hz for example. The number of harmonics may be selected, where the maximum number of harmonics depends on the sampling frequency. The entire extracted event section may be transformed into the frequency domain by means of the FFT algorithm. The resultant data is prepared to facilitate the Machine Learning algorithm input stage and recorded as part of the feature vector described in further detail below.

When the second algorithm determines that the appliance is in operation and therefore has switched on, it records and retains all the raw data, events and their features in a time stamped table, for example as depicted by FIG. 2, until the appliance transits into the off state 3. The off state is determined by the type of appliance for example. By way of example only, a washing machine on state is determined by the particular shape of the door lock when it engages as shown in—FIG. 7 and labelled 1 for example. The time stamp of this on state for a washing machine is recorded in the feature vector table together with the relevant features of the signal as discussed later. When the washing machine goes into rest mode or low power consumption mode during some cycles, such as in between the states shown in FIG. 7 and labelled 6 and 7, this does not mean the appliance has switched off.

Figure 7:
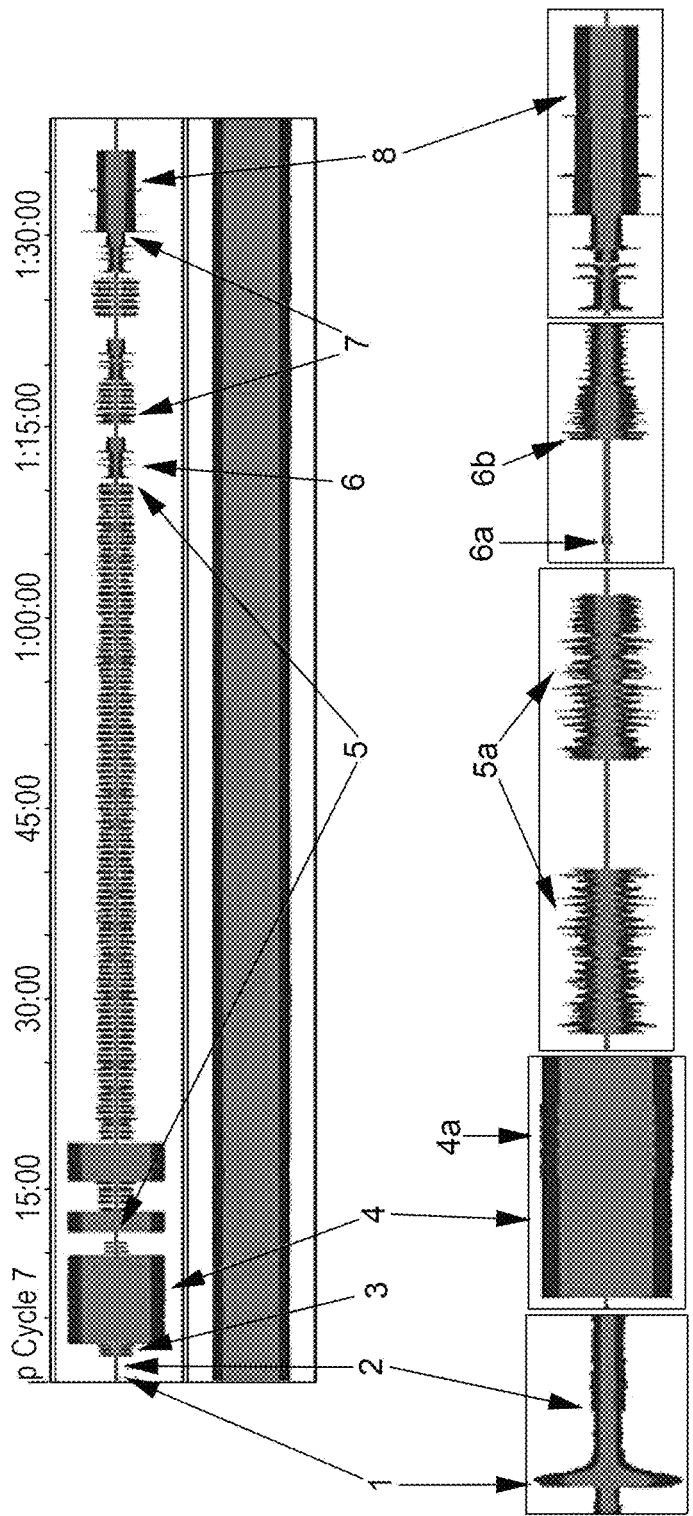
FIG. 7 shows a breakdown of the components operating within an example washing machine cycle.

The completion of a cycle and hence the point at which the appliance is deemed to be in the off state, may be determined by a specific set of features within the power profile. In the case of a washing machine, the off state may be determined by the low power state the washing machine is consuming after the long (mostly fast) spin cycle as depicted in FIG. 7 and labelled 8.

By way of another example only, a fridge compressor motor switches on and off periodically and therefore a fridge does not have an on/off cycle (as it is always on). In such a case, a reasonable portion of data may be retained and analysed. This portion of data may be 24 hours long for example. The duration of the portion of data may be appliance specific and may be pre-determined depending on the appliance category.

In order to correctly identify an appliance that is continuously on, the on state may be defined as the point when a substantial and measurable amount of power starts being drawn by the appliance and ends after a pre-determined duration. This is desired to align the on state of the device under examination with the on state of appliances in the recall list. When the appliance is determined to be in its off state, the whole feature vector for the on duration is presented to a first classifier that has been trained on similar data as detailed in the following paragraphs. This first classifier outputs a vector of probabilities that the appliance under test matches each of the appliances within the recall list. The vector of probabilities may then be processed by another algorithm as described below to output a binary decision determining whether the appliance under test is found within the recall list.

The first classifier algorithm makes use of a Machine Learning algorithm, explained further in the following paragraph, to identify the type or model of the appliance. If the algorithm detects a positive match 6, the information is reported 7 to the host system. The appliance is now marked as "under recall" state and the information stored contains the entire set of data that led to this conclusion. In instances where there are subtle variations, a number of subsequent identical conclusions may be necessary to classify the appliance as being under recall state. The output of the algorithm may be a probability that the appliance is under recall, which may initiate a communication process. This communication, normally to the user, owner and/or maintenance personnel for example, may be achieved through notifications on a mobile and tablet app, on a cloud system, via e-mail and/or any other means. In addition, every time the appliance is used, a new notification may be sent out.

The Machine Learning algorithm 5 which can be by way of example, a Hidden Markov Model algorithm (HMM) or a Deep Neural Network algorithm or any other suitable learning algorithm that is capable of training or learning and subsequently performing classification, is trained using real data. The real data may be collected through various means such as Non-Intrusive Load Monitoring (NILM) device installed at the electricity cabinet of various homes and a number of appliances installed in a lab, which are also equipped with NILM devices. In addition, the energy profiles of appliances in the recall list are collected from various homes and in a lab.

Figure 4B:
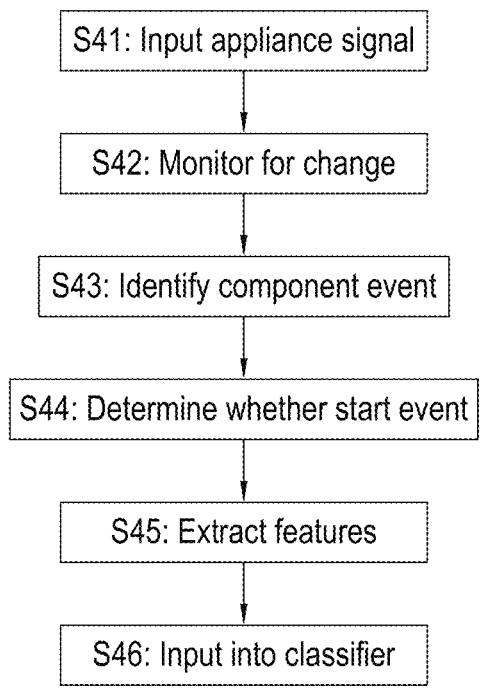
FIG. 4(b) shows a flowchart of a method in accordance with an embodiment.

FIG. 4(b) shows an appliance operation signal processing method according to an embodiment.

In step S41, an appliance operation signal comprising information relating to operation of an appliance is obtained.

The signal may comprise an input current signal i(t) and/or an input voltage signal v(t) for example. The voltage and/or current signals may comprise data generated by sampling the current and/or voltage using one or more sensors, for example a current sensor and/or voltage sensor. In an embodiment, sampling is performed at a sampling frequency of greater than or equal to 1 kHz. Sampling at 1 kHz results in 20 samples per mains cycle, where the mains frequency is 50 Hz. The utility consumption signal may comprise a single phase signal comprising a single current and voltage signal, a split phase (or dual phase) signal comprising two current signals and two voltage signals, or a three phase signal comprising three current signals and three voltage signals for example.

A single appliance or multiple appliances may be monitored. The appliance operation signal may therefore correspond to data relating to operation of one or more appliances. A single appliance may be monitored using smart device connected to the appliance, for example a smart plug or smart switch, sub-metering device or energy monitor. Multiple appliances may be monitored by a smart meter device for example.

Further processing of the input current and/or voltage signals may be performed to generate one or more appliance operation signals from the input current and/or voltage signals. For example, a total power consumption metric may be obtained, for example real power, apparent power and/or RMS current. This may be obtained for windows corresponding to a plurality of samples in the input signal for example.

The monitored appliances may include any household or commercial electrical appliance, including but not limited to heat pumps, HVAC (heating, ventilation, and air conditioning), electric vehicles and white goods (fridge, freezer, washing machines, dryers, dishwashers).

In S42, the operation signal is monitored for a change in magnitude. A step detection algorithm may be performed, for example, using a total power consumption metric (e.g. power or RMS current). Once a step is detected, referred to as an event, a portion of the signal corresponding to the event may then be extracted for further processing. The events may be extracted in portions of fixed or varying duration. For example, a pre-event portion of fixed duration and a post-event portion of fixed duration may be extracted corresponding to the event each time a change in magnitude is detected. The portion may be extracted for one or more of: an input current signal, an input voltage signal, a power signal (e.g. real power and/or apparent power), and an RMS current signal.

When a change in magnitude has been detected in e.g. the power signal, a further step of detecting for a change in the frequency data may also be performed.

Once a change in magnitude has been detected, data corresponding to the event portion may then be generated in this step. The data may comprise current and/or voltage signals corresponding to the event portion (with or without background removed), RMS current or power signals corresponding to the event portion (with or without background removed), aggregate values (such as total real power change for example), and/or frequency data (such as harmonic magnitude values).

In an embodiment, a change in magnitude is detected if a change greater than a threshold value is detected. In an embodiment, the threshold is 10 Watts.

Further criteria may be applied during step detection, for example, changes in real power level that exceed a threshold and are preceded and followed by quiet periods of low variance may be detected as events. These detected steps may then be extracted in windows of varying duration, dependant on the time taken for the signal to settle into a low variance regime.

In an embodiment, a change is detected by calculating the difference between adjacent power samples in the real power time series signal, referred to as the deltapower. When the deltapower value exceeds a threshold value, an event is detected. Alternatively, an event may be detected only if the sum of the deltapower values within a specified time window exceeds a threshold value for example.

In an embodiment, where the utility consumption signal comprises a split or three phase electrical signal, monitoring for a change in the magnitude of the input signal may comprise monitoring each phase, where a change detected in any phase is detected as an event. This may comprise generating one or more of the corresponding real, apparent or RMS current signals from each pair of current and voltage signals, and monitoring each. A change detected in any of the signals is registered as a change.

Once an event has been detected, data corresponding to the event may then be generated and used for event identification.

The data depends on the nature of the monitored signal. For example, where the signal is measured by a device connected directly to a single appliance such as a kettle, the data may simply be a power change value between the post-event portion and the pre-event portion.

Where the signal corresponds to operation of an appliance having multiple components, or to multiple appliances, the data may comprise a vector of extracted features, or several time series of extracted data for example.

A background removal step may be performed at this stage. For example, when the event is an "on-set" (i.e. a device switching on, where the change in magnitude is positive) the pre-event portion may be subtracted from the post-event portion before features are extracted. When the event is an "off-set" (i.e. a device switching off, leading to a negative change in magnitude) then the post-event portion may be subtracted from the pre-event portion.

A mean current cycle value may be generated, for example by calculating the mean current value for each discrete time location in the current cycles in the pre-event portion for an on-set event (or the post-event portion for an off-set event), resulting in a mean current vector which is representative of the background. Removing the background then involves subtracting this mean current vector from the current vector of each cycle of the post-event signal portion (or the pre-event signal portion for an off-set event). The process may additionally or alternatively be performed for a power signal corresponding to the event signal portion for example (e.g. real power signal, apparent power signal).

Frequency data corresponding to the event may also be extracted in this step, for example amplitude values for one or more harmonic frequency components. Background removal may also be performed on the frequency data. For example, the pre-event current and voltage signals may be converted into the frequency domain using a Fast Fourier Transform (FFT) algorithm, and the post-event current and voltage signal converted into the frequency domain using the same FFT. The resultant peaks of the pre-event are then subtracted from the post event peaks (for an on-set event) to give resulting frequency data corresponding to one or more harmonic magnitude values. The post-event peaks are subtracted from the pre-event peaks for an off-set event. The amplitude value corresponding to a plurality of harmonic frequencies, wherein the harmonic frequencies are the positive integer multiples of the fundamental frequency of the appliance operation signal, may be extracted for example. The fundamental frequency for the case of an electrical signal corresponds to the mains frequency, which is 50 Hz in the UK and 60 Hz in the US for example.

In this step, a change of magnitude in the input data is detected as an event. Data relating to the event portion, for example generated from the signal data from before and after the event, is then generated.

In S43, the event is identified from the data generated in S42. This may comprise simply applying one or more stored rules. For example, where the signal is measured by a device connected directly to a single appliance such as a kettle, the data extracted in S42 may simply be a power change value between the post-event portion and the pre-event portion. In S43 it may be determined whether the power change is greater than a threshold value. If it is greater than the threshold, the event is identified as a kettle switch-on event.

Alternatively, the data relating to the event extracted in S42 may be inputted into a second algorithm for example. The second algorithm may comprise a second classifier configured to output a probability corresponding to each of a plurality of events. The event may then be identified as that with the highest probability for example.

Alternatively, some further processing may be performed to identify the event, for example taking into account data from previous events. Where a single appliance is being monitored, events relating to multiple components in the appliance may be identified for example, such as 'door lock start' for a washing machine. Where multiple appliances are being monitored, events relating to different appliances and different components within appliances may be identified.

Thus in step S42, a classifier input is generated corresponding to the event. In S43, the input is inputted into the second classifier. The second classifier may be a machine learning based classifier that is trained prior to implementation. The training stage will be discussed later.

The second classifier may generate an event probability value for each of one or more appliance or appliance component state changes. The event probability value is the probability that the event portion of the signal corresponds to the change in state of the appliance or component.

The classifier input is obtained from the signal data in S42, for example the data time series themselves may be directly input to the second classifier (for example the current, voltage, RMS current and/or power time series, with or without background removed) or further processing may be applied to the time series before inputting to the second classifier (for example buffering/stretching, normalising, etc). Alternatively, a one-dimensional feature vector of values may be generated in S42, comprising for example a power change value, frequency data such as harmonic magnitude values for the current and/or voltage, real power values and/or apparent power values. This feature vector may then be input into the second classifier.

For a split phase (or dual phase) signal comprising two current signals and two voltage signals, features may be generated corresponding to each phase. Similarly, for a three phase signal comprising three current signals and three voltage signals, again features may be generated corresponding to each phase.

The second classifier may be a neural network based classifier for example. For example, where a feature vector is generated corresponding to the event in S42 (comprising for example a real power values, apparent power values and one or more harmonic magnitude values for current and voltage), this feature vector is then input into the second classifier comprising an artificial neural network (ANN) in S43. Each node in the input layer of the ANN computes a weighted sum of all of its inputs (being each of the features in the feature vector) and an additive bias term, and then applies an activation function to the result. The outputs of each layer are then fed as the inputs to the subsequent layer. Each node again computes a weighted sum of all of its inputs (being the outputs of each node in the previous layer) and an additive bias term, and then applies an activation function to the result. Each node in the final layer outputs a value into the vector of probabilities, where each probability in the output vector corresponds to the probability that the event corresponds to a particular appliance or appliance component state change. The weights and biases are the trainable parameters, the values of which are learned during the training stage (described later).

A convolutional neural network (CNN) may be used where two or more 1-dimensional time series are taken as input. CNNs are a class of neural network that include one or more convolutional layers. A convolutional layer comprises a set of linear filters, each characterised by a weights vector, and an additive bias term per filter. During operation each filter is convolved across the input data time series.

The list of appliance and/or component state changes, which correspond to classes and sub-classes in the second classifier, and the corresponding event probability values outputted from the second classifier may be converted to an event identification, for example by selecting the state change corresponding to the highest probability or by performing some further processing based on the previously identified state changes.

In this step, any suitable method of identifying the appliance or component state change corresponding to the signal event may be performed.

In S44, it is determined whether the component event is a designated sequence start component event. The event identified in S43 may be compared to a stored list of designated sequence start component events for example. For example, a list of one or more sequence start component events for the appliance may be stored where a single appliance is monitored. A list of one or more sequence start component events for a number or appliances and/or appliance components may be stored where multiple appliances and/or components are monitored.

If it is determined not to be a designated sequence start event in S44, it may be determined whether it is an end event for example. If so the feature vector, may still be populated. If the system can't determine what the event is then it is ignored.

Steps S44 and S43 are described as separate steps, however, in practice a single processing step may be performed that identifies the component event corresponding to the change and whether it is a designated sequence start event.

If the component event is determined to be a designated sequence start component event in S44, in S45, one or more features from the input appliance operation signal between the sequence start component event and a sequence stop point are extracted.

For example, in this step, it may be monitored for any further change in magnitude, in the same manner as described in S42. A step detection algorithm may be performed such as described previously in S42. Once a step is detected, referred to as an event, a portion of the signal corresponding to the event may then be extracted, in portions of fixed or varying duration. Data corresponding to the event may then be generated and used to identify the event, as has been described previously in relation to S43.

Again, the data extracted depends on the nature of the monitored signal. For example, the data may simply be a power change value between the post-event portion and the pre-event portion, or a vector of extracted features, or several time series of data for example. Again, a background removal step may be performed as described previously. The further event is then identified. This may be done in the same manner as described in S43, for example using the second classifier.

It is then determined whether the component event is a sequence stop point. The event may be compared to a stored list of designated sequence stop component events for example. If the event is not a sequence stop component event, then it is monitored for a further change in magnitude, and the process iterates until a sequence stop event is found. Features corresponding to each event may be stored, for example in a feature table such as shown in FIG. 2. Extraction of these features will be described below.

In an embodiment, for each identified event it is also determined whether the event corresponds to the same appliance as the start event. This may be done where the input signal corresponds to different appliances for example. If the event does correspond to the same appliance as the start event, features relating to the event are stored in the table and it is determined whether the event is a stop event. If the event does not correspond to the same appliance as the start event, the processing in S45 is continued separately for the original appliance, and it may also be determined separately whether the new event corresponding to the new appliance corresponds to a start event (in other words step S44 onwards may also be performed for the new appliance, and a separate feature table generated for the new appliance for example).

Alternatively, if some of the events detected belong to a different appliance, then there is simply a mismatch in the features, and the first classifier will not classify the appliance as under recall. In future cycles, all events in the sequence may be detected correctly, and a positive match found.

In the method described above in relation to FIG. 4(b), where multiple appliances are monitored, disaggregation is performed as part of the method. The event detection and identification steps S42 and S43 are performed, and the events and corresponding features are then separated into feature vectors for inputting into the first algorithm, each feature vector corresponding to the events for one appliance only, as described above. Thus separation of the events and corresponding features to different appliances occurs after the event detection and identification steps S41 and S42.

However, alternatively, disaggregation may be performed separately, as a pre-processing step, in which events are detected and identified. The input signal is then separated into separate signals, one corresponding to each appliance. The steps S42 and S43 and the following steps are then performed on the input signal corresponding to a single appliance only. There is no step of separating the features corresponding to different appliances in this case, since the signals are pre-separated into single appliances. In both cases, the first algorithm may take input feature vectors corresponding to different appliances, in sequence.

The sequence stop point may be alternatively be automatically designated as a certain time duration after the start event for example. For example, where the start event is designated as a "fridge compressor motor switch on", the stop point may be designated as 24 hours after this point.

A stored set of rules governing the designation of the sequence stop event given each start event may be applied, where for some start events (e.g. for a washing machine "door lock close" start event) it is monitored for further events (the further events being identified and then it being determined whether they are stop events) and for other start events a period of time is specified. This may be the case where the signal corresponds to multiple appliances or components of an appliance for example.

One or more features from the input appliance operation signal between the sequence start component event and the sequence stop point are extracted.

In an embodiment, for each event in the sequence (including the start event and any end event) a fixed number of features are extracted corresponding to the event. Thus a fixed-length feature vector corresponding to each event in the sequence is extracted. The features may be the same as those extracted to identify the event for example.

For different appliances, there may be a different number of events in the sequence. Thus a different number of feature vectors may be extracted for different appliances. However, the length of each feature vector will be the same. Thus for the table shown in FIG. 2, the number of rows will depend on the appliance, but each row comprises the same number of columns.

For example, the feature vector may comprise time location information of the event in the sequence (where the sequence start component event is taken as the zero point). Thus for the start event, the feature vector comprises a zero time stamp, and for each subsequent event the feature vector comprises a time stamp value. The time location information may be relative to a start time of the sequence start component event. For each identified component event in the sequence (including the start event and any stop event) the feature vector may comprise a start time of the component event and a stop time of the component event. The time information may be in milliseconds for example. The start time may be in date and time format, and is the reference to all deltas for that appliance.

In an embodiment, the feature vector for each event in the sequence may comprise one or more of the features extracted for each event in order to identify the event as described above in relation to S42. For example, data time series (for example the current, voltage, RMS current and/or power time series (real and/or apparent for example), with or without background removed), data time series with further processing applied (for example buffering/stretching, normalising, etc), aggregate values (such as power change values for the event), and/or frequency data such as current and/or voltage harmonic magnitude values for the event may be included for example. In an embodiment, the features comprise voltage, current and their harmonics and transients for a portion of the signal corresponding to the event, real and apparent power and their harmonics and transients for a portion of the signal corresponding to the event, current and voltage trajectories (IV trajectories) for a portion of the signal corresponding to the event, and any other relevant information relating to each event in the sequence (i.e. between the sequence start component event and the sequence stop point, including the start event and the stop event if any). In an embodiment, the same feature vector used as input to the second classifier for each event is also used as input to the first classifier.

A transient is a type of event, which comprises an initial power increase followed by a return to a lower steady state. Such changes may be seen in the voltage, for example features such as one or more of the harmonic amplitude values for the voltage (for example V_hmn in FIG. 2). They are also visible in the power features. A transient is a non-repetitive spike in the signal which may occur, for example, when a high powered component is turning on, but are not seen through the operation of that component.

The trajectories are plots of current versus voltage (IV) or real versus apparent power (PQ) for example. The shape of these trajectories may be used to classify the appliance or component. The feature vector may comprise the raw pixel values of the image or images. Alternatively, the image may be down-sampled and/or normalised. Aggregate features may be used.

A real power value may be calculated for each of a plurality of cycles:

$$P_i = \frac{1}{n_{cyc}} \sum_{k=1}^{n_{cyc}} v_k(t) i_k(t), t \in T_i$$

where $n_{cyc}$ is the number of samples per mains cycle and $T_i$ is the duration of the i-th mains cycle. For a 10 kHz sample rate in a country with 50 Hz main power, $n_{cyc}=200$. $V_k(t)$ is a time series of the voltage values for the cycle k and $i_k(t)$ is a time series of the current values for the cycle k, either with or without the background removed.

The apparent power value for each cycle may be calculated from:

$$|S|_i = \frac{1}{n_{cyc}} \sqrt{\sum_{k=1}^{n_{cyc}} v_k(t)^2} \sqrt{\sum_{k=1}^{n_{cyc}} i_k(t)^2}, t \in T_i$$

At least one of the features may correspond to at least one frequency component of the signal, for example at least one of the fundamental or harmonic frequencies of the signal. For an electrical signal, the fundamental frequency corresponds to the mains frequency (also referred to as the utility frequency or line frequency). This is the nominal frequency of the oscillations of the alternating current signal. In the UK this is 50 Hz, whereas in the US this is 60 Hz for example. In practice, the mains cycle frequency may not be constant, but may continuously drift within a range of values. The fundamental frequency (e.g. mains frequency) is used as the bases of the Fourier transform. The harmonics are calculated based on the fundamental frequency. The Fourier transform may have a built-in mechanism to deal with the small shifts in mains frequency.

For a split phase (or dual phase) signal comprising two current signals and two voltage signals, features may be generated corresponding to each phase. Similarly, for a three phase signal comprising three current signals and three voltage signals, again features may be generated corresponding to each phase.

In an embodiment, the feature list comprises the voltage, current, real power, apparent power (all harmonics up to the 21st harmonic for example), IV trajectory and PQ trajectory, the time delta and duration, for each event.

Features from the feature list (for example the voltage, current, real power, apparent power, and/or harmonic magnitude values) may be converted into 32 bit floats for example. The trajectories may be converted to moments which create features such as area, centroid, orientation, shape factor, length and width (both calliper and box method), skewness and kurtosis, which are also converted in 32 bit floats. The time delta may be converted to a 32 bit float which completes the feature vector for the event that acts as an input to the first algorithm.

In S46, a feature vector comprising the one or more features is inputted into a first algorithm which outputs information relating to the recall status of the appliance. In this step, a probability that the appliance corresponds to an appliance model designated as recalled may be determined, by applying a first algorithm, for example comprising a first classifier, to the one or more features. Each probability corresponds to the probability that the appliance corresponds to a particular appliance model which has been designated as recalled.

Figure 9:
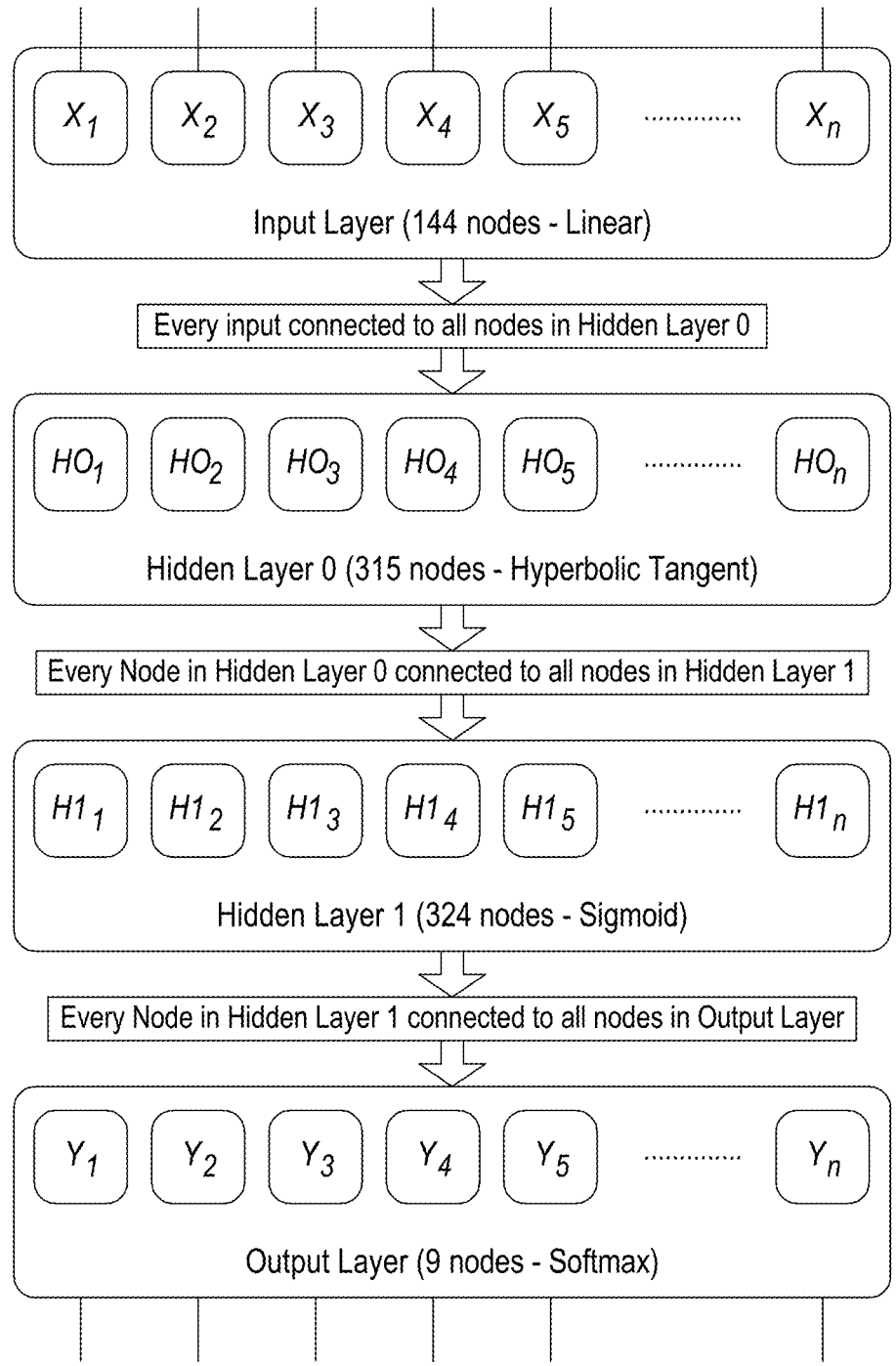
FIG. 9 shows a schematic illustration of an example neural network that may be used in the first algorithm.

The first algorithm may comprise an artificial neural network for example. A schematic illustration of an example of an artificial neural network that may be used is shown in FIG. 9.

The feature vector for each event in the sequence (the start event through to the stop point) may be inputted to the first algorithm in the same step (in parallel). For example, the input to the first algorithm may comprise a 1D vector, which comprises the feature vectors corresponding to each event combined, for example concatenated together. In other words, the table in FIG. 2, comprising a fixed length feature vector corresponding to each event in the sequence, is flattened into a 1D feature vector.

Different appliances may have different numbers of events in the sequence. During training, a maximum number of events may be determined, corresponding to a maximum input length. Where an appliance sequence comprises fewer events than the maximum, the 1D vector is padded to give a fixed length for each input. The padding depends on the number of rows, so that the input length is fixed.

This 1D feature vector is then input into the first algorithm comprising the artificial neural network (ANN). Each node in the input layer of the ANN computes a weighted sum of all of its inputs (being each of the features in the feature vector) and an additive bias term, and then applies an activation function to the result. The number of nodes in the input layer corresponds to the length of the input 1D vector. In an embodiment, there are 144 nodes in the input layer.

The outputs of each layer are then fed as the inputs to the subsequent layer. Each node again computes a weighted sum of all of its inputs (being the outputs of each node in the previous layer) and an additive bias term, and then applies an activation function to the result. There may be two hidden layers for example.

Each node in the final layer outputs a value into the vector of probabilities, where each probability in the output vector corresponds to the probability that the appliance corresponds to a recalled appliance or not. The output layer may apply a softmax function for example. The number of nodes in the output layer corresponds to the number of recalled appliances+1. In the example, there are nine nodes in the output layer.

The weights and biases are the trainable parameters, the values of which are learned during the training stage (described later).

The output of the neural network is a vector of probabilities, having a length corresponding to the number of appliances under recall+1. The additional entry corresponds to "no match". Each output is a float number between 0 and 1, representing the probability of a match to that entry, with the sum of all outputs being 1.

The probabilities output by the first classifier may be normalized. The highest probability value may be compared to a threshold value for example to determine whether the appliance is present within the recall list.

A further criteria may be specified to determine whether the appliance is present within the recall list, for example, that a positive result is returned a certain number of times.

Alternatively, the feature vectors corresponding to each event may be inputted sequentially, using an LSTM (Long short-term memory) neural network for example.

In the above described method, the first algorithm is configured to output a vector of probabilities, where each probability in the output vector corresponds to the probability that the appliance corresponds to a recalled appliance, and there is an additional entry in the vector corresponding to the probability that the appliance doesn't correspond to any of the recalled appliances. The first algorithm determines whether the appliance corresponds to a particular model of the appliance which is designated as recalled, where each output probability corresponds to one of the models (and no match).

However, alternatively, the first algorithm may output the probability that the appliance corresponds to each of a plurality of models, regardless of whether the models are recalled. For example, each probability in the output vector corresponds to the probability that the appliance corresponds to a particular model of the appliance, and there may be an additional entry in the vector corresponding to the probability that the appliance doesn't correspond to any of the models. In this case, rather than being trained to determine whether the appliance corresponds to each of a plurality of recalled models, the first algorithm is trained to determine whether the appliance corresponds to each of a plurality of models (where the recall status of the model is not taken into account).

Figure 8:
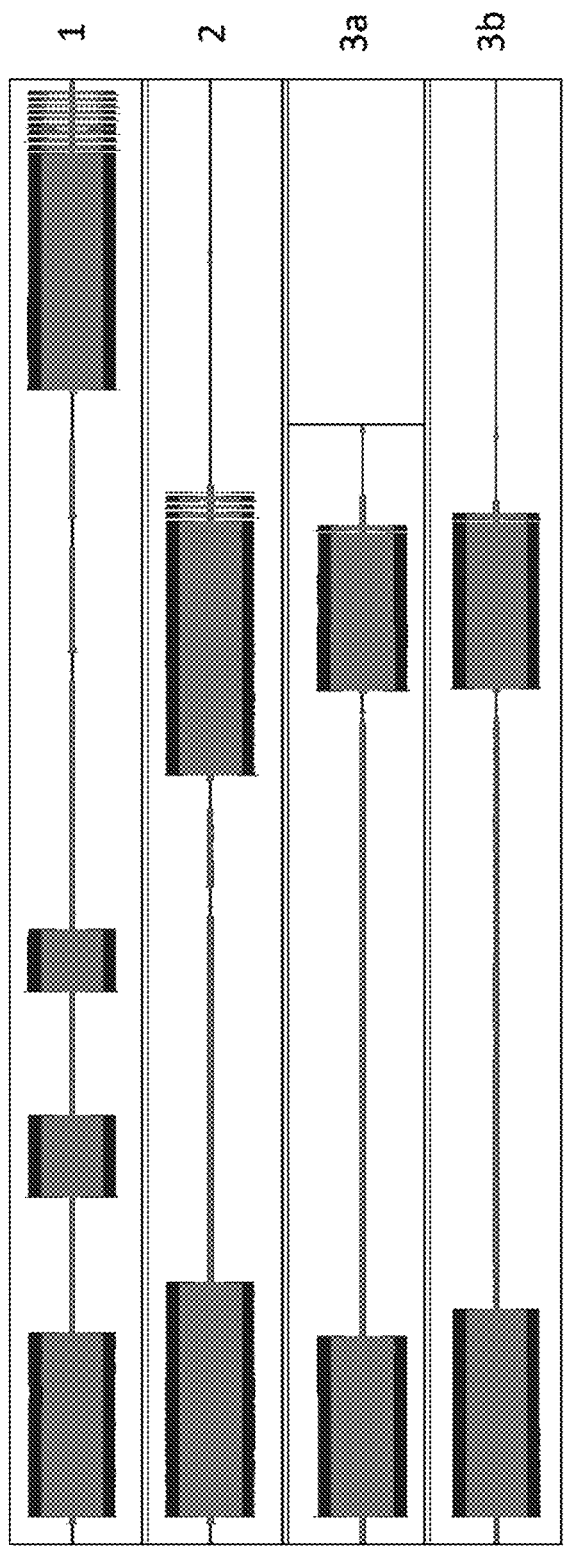
FIG. 8 shows a difference between 3 example dishwasher cycles and variations in example cycle timings within one dishwasher.

The real data is collected through various means such as a Non-Intrusive Load Monitoring (NILM) device installed at the electricity cabinet of various homes and/or a number of appliances installed in a lab, which are also equipped with NILM devices. In addition, the energy profiles of appliances in the recall list are collected from various homes and in a lab for example. FIG. 8 shows signatures from a number of different dishwashers (1, 2, and 3a). 1 and 2 represent signatures from different dishwasher models while 3a and 3b are from the same make and model but running at different cycles. The collected data is aggregated into one dataset and annotated accordingly. The annotation is carried out for example by a minimum of two trained individuals linking the appliance under recall data (from the recall list) to relevant labels, categories, etc. such as, by way of example only, the identity of devices, the model number, whether it exists in the current recall list and its complete feature vector. The feature vector may be made up of time stamps, standard deviation and Euclidean distances on various runs of the same cycle or program, etc., as depicted in FIG. 2 for example. The standard deviation and Euclidean distance refers to how much the feature vectors differ from the training data, both in deviation (2D) or Euclidean distance (3D). The latter takes the 3rd dimension in the form of time, therefore can be seen as deviation plotted against time. These metrics may be included in the feature vector, or simply used to identify outliers for example. Both individuals may use a common, purposely built annotation tool where the results are compared to ensure equivalence and any discrepancy corrected. This results in a laboriously annotated reference dataset with negligible or no observed variation, avoiding an inter-rater reliability study for example.

FIG. 2 shows an example vector, comprised of a log of times at which various components within the appliance have switched on and off. The table shows part of an example feature vector of a washing machine, where the starting point or on state of the washing machine is determined by the locking of the washing machine door. This also initiates the appliance's feature vector. Subsequent entries may overlap depending on their on-duration such as the 'water valve open' entry in the same table. These timed entries also contain the various signal information in the feature list which may be composed of, by way of example only, voltage, current and power harmonics, transients, standard deviation and Euclidean distances on various runs of the same cycle or program, etc. The feature vector may comprise information relating to when various components have switched on and/or the duration that these components are on for.

Such features can also be stored for the appliances on the recall list, and this information may be compared to the appliance feature vector being assessed. Given such a feature vector, the whole cycle of the appliance may be reconstructed with some data loss from the feature vector information only. The annotated and detected components are further described below.

Figure 6:
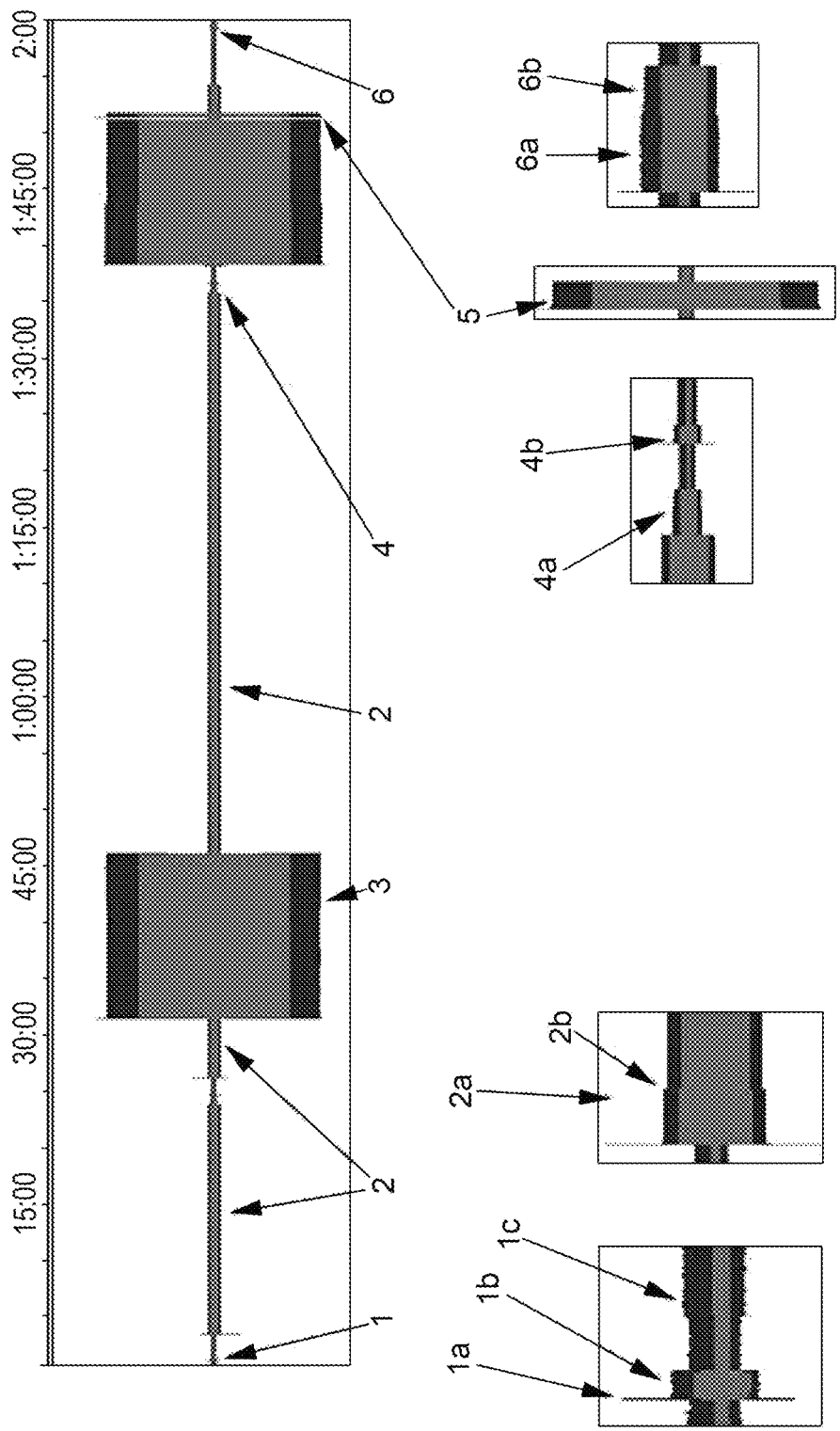
FIG. 6 shows a breakdown of the components operating within an example dish washer cycle.

=FIG. 6 shows an example dishwasher cycle where stage 1 is the start of the cycle. Stage 1a is an example trigger of the dishwasher start of cycle followed by stage 1b corresponding to the drain pump and shortly after stage 1c corresponding to the water inlet valve opening. Once the water level inside the appliance reaches the desired level, the circulation pump in stages 2 and 2a switches on, however it can be observed that the power drawn by the circulation pump reduces slightly after a few seconds. This is because the blades sprinkling the water inside the dish washer have reached maximum speed and maintain their momentum, therefore the pump requires less effort to drive the water out of the spinning blades. Stage 3 shows the water heater switching on and off to heat up the water within the appliance while stage 4 shows the end of the main wash portion of the cycle. Stage 4a depicts the drain pump switching on and off after the circulation pump is switched off, while stage 4b illustrates the drain pump turning on briefly after a short rest period. Stage 5 indicates an additional water heating period after the main heating portion while stage 6 depicts the end of the cycle. The end of the cycle is characterised by the drain pump switching on in stage 6a after a considerable rest period were once the water is evacuated from the appliance the power drawn by the pump is less in stage 6b than at the start of the drain portion.

All these timings may be recorded in the feature vector (as depicted in FIG. 2 for example) together with the relevant signature information such as one or more of: voltage, current and their harmonics and transients, real and apparent power and their harmonics and transients, current and voltage trajectories (IV trajectories) and any other relevant information specific to the appliance. The timings recorded are in reference to the start of the cycle.

Similarly, FIG. 7 shows an example washing machine cycle where the start of the cycle is characterised by the door lock in stage 1 and the opening of the water inlet valve in stage 2 soon after. Stage 3 shows the drum rotating where every subsequent turn draws more power than the previous. This is because the cloths in the washing machine are increasingly impregnated with water and therefore become heavier therefore requiring more effort for the drum to turn. Stage 4 shows the water heater switching on while stage 4a illustrates the drum turning while the water heater is still on. The area covered by stage 5 is the main wash cycle whether the drum rotates periodically with higher resolution of the drum turn shown in stage 5a. Stage 6 shows the drain stage 6a and short spin stage 6b cycle. The area covered by stage 7 is made up of 2 rinse cycles while stage 8 is the final and fast spin cycle. The feature vector based on this component overview is created in the same way as described above and depicted in FIG. 2 for example.

Figure 5A:
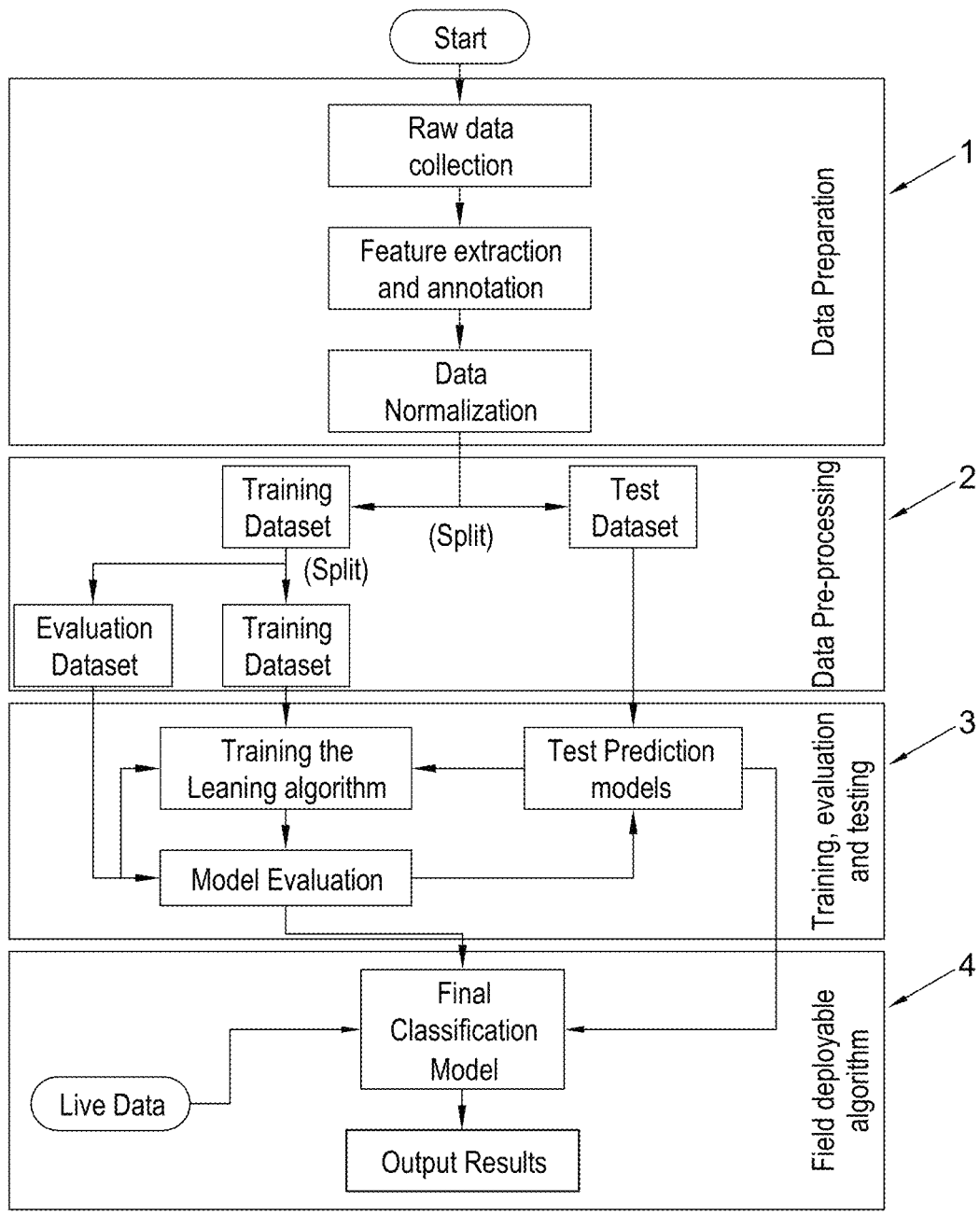
FIG. 5(a) shows a flowchart of a method for training the machine learning algorithm in accordance with an embodiment.

The training process will now be described. Referring to FIG. 5 the data from the NILM devices is collected, analysed to extract relevant features, manually annotated as described above, and normalized in the Data Preparation stage 1. This stage may also involve transforming the data into the frequency domain so that the HMM algorithm or Neural Network algorithm for example is trained in both time and frequency domain. The data is then split into a Training Dataset and a Test Dataset, where the former is further split into the actual Training Dataset and an Evaluation Dataset in the pre-processing stage 2. The algorithm is then trained, evaluated and tested in stage 3 through a number of iterations or epochs until the algorithm fits the required models. The final classification algorithm is then presented with Live Data in a real world environment 4 to verify the results before being deployed into NILM devices.

By way of example only, the said algorithm could be deployed in a NiLM device that is actively disaggregating appliance electrical information in a premises by sampling current and/or voltage at the said frequency. When an appliance is identified, tracked through its operation cycle and transits into its off state, the second algorithm extracts key features as described above (feature vectors) and passes the information to the first classification algorithm which has been trained to identify devices within the recall list. The first classifier outputs a probability value indicating the appliance is possible part of the recall list. The list of probabilities is processed by another third algorithm as described above to output a binary decision determining whether the appliance under test is found within the recall list for example. If it is determined that the product is under recall, then a communication routine is triggered.

The recall list and in turn the first classifier may be updated periodically to reflect the updates in the list as specified by appliance manufacturers or other institutions. The updated classifier may be deployed to all the NiLM devices as and when required by means of remote update. Therefore appliances that have already been classified as not part of the recall list may be processed by the first classifier every time the recall list is updated or every time the appliance recall list for a specific category of appliances is updated.

Figure 5B:
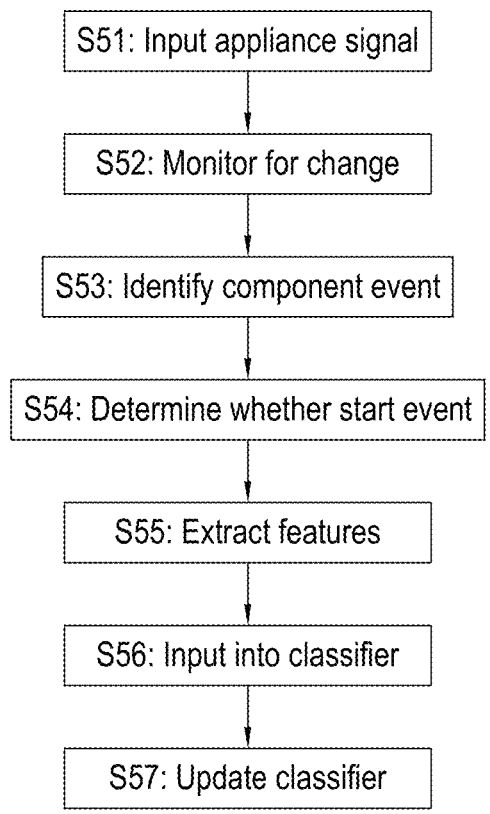
FIG. 5(b) shows a flowchart of a method of training in accordance with an embodiment.

FIG. 5(b) is a flow chart of a method of training a first algorithm to determine information relating to a recall status of an appliance.

The training method uses a corpus of data comprising appliance operation signals, each comprising information relating to operation of the appliance and each annotated with information relating to whether the appliance corresponds to an appliance model designated as recalled.

The corpus comprises signals from a set of appliance models designated as recalled and from appliance models not designated as recalled.

An appliance operation signal from the training corpus is inputted in S51. The signal is monitored for a change in magnitude in step S52, in the same manner as described previously in relation to S42.

If a change is detected, a component event corresponding to the change is identified, in the same manner as described previously in relation to S43. The second algorithm is used for event identification in this step as described previously.

Step S54 comprises determining whether the component event is a designated sequence start component event, which is performed in the same manner as described above in relation to S44.

If the component event is determined to be a designated sequence start component event, one or more features are extracted from the input appliance operation signal between the sequence start component event and a sequence stop point in S55, as has been described previously in relation to S45.

These features are then inputted into the first algorithm as has been described previously in relation to S46, which outputs information relating to a recall status of the appliance in S56.

For example, the output information may comprise a vector of probability values, each corresponding to a particular appliance model which has been designated as recalled, and probability value corresponding to "no match", as has been described previously.

The training information relating to whether the appliance corresponds to an appliance model designated as recalled may comprise a ground truth vector. For a recalled appliance, the probability value corresponding to each appliance model designated as recalled is zero for appliance models which do not correspond to the appliance, one for the appliance model which does correspond to the appliance, and zero for the "no match" entry. For an appliance which is not recalled, the probability value corresponding to each recalled appliance is zero, and one for the entry corresponding to "no match". Thus for an input signal from an appliance on the recall list, the information relating to whether the appliance corresponds to an appliance model designated as recalled may comprise a vector, comprising a value of 1 for the entry corresponding to the appliance model and 0 value for the other entries. For an input signal from an appliance not on the recall list, the information relating to whether the appliance corresponds to an appliance model designated as recalled may comprise a vector comprising a value of 1 for the "no match" entry, and a 0 value for the other entries. Therefore, if we there are 4 appliances in the recall list, the idealistic output would be [1,0,0,0,0] for the first appliance [0,1,0,0,0] for the second, etc . . . with all other appliances being [0,0,0,0,1]. These vectors may be generated automatically from a label of whether the appliance is under recall (i.e. whether it is in the recalled list).

These are used by the first neural network to train the weights of the neurons to output a 1 if it detects an appliance in the recall list. The first algorithm is trained using the feature vectors and the expected output.

The ground truth vector and output vector from the first algorithm may be used to determine a loss. The loss is a measure of error between the computed outputs and the desired target outputs of the training data. The loss function may be a cross entropy error for example. The gradient of the loss with respect to each of the trainable parameters of the first algorithm (e.g. the weights and biases of a neural network) can be determined through back-propagation, and used to update the parameters. The signals may be inputted in batches, and the update performed for each batch. This results in an array of gradient values, each corresponding to a parameter (i.e. weights, biases) for each signal in the batch. These are converted to a single gradient value for each parameter (for example by taking the average of the gradient values for the particular parameter).

The resulting gradient for each parameter is then used to calculate the updated parameter from the previous values using an optimizer function (e.g. a gradient descent type optimiser function). The input to the optimiser function for each parameter is the previous value, the corresponding gradient value and a learning rate parameter.

In general, gradient descent based optimizers update the parameter in the direction of steepest descent of the loss function with respect to the parameter, scaled by a learning rate. The parameters are replaced with the new values and the process iterates with another batch of training examples.

The second algorithm may be trained in the same manner, using labels which identify the state change corresponding to events in the signal. The loss function may also be a cross-entropy loss function. The first algorithm and second algorithm are trained on the same data.

In the above described training method, the first algorithm is trained to output a vector of probabilities, where each probability in the output vector corresponds to the probability that the appliance corresponds to a recalled appliance, and there is an additional entry in the vector corresponding to the probability that the appliance doesn't correspond to any of the recalled appliances. However, alternatively, the first algorithm may be trained to output the probability that the appliance corresponds to each of a plurality of models, regardless of whether the models are recalled. For example, each probability in the output vector corresponds to the probability that the appliance corresponds to a particular model of the appliance, and there may be an additional entry in the vector corresponding to the probability that the appliance doesn't correspond to any of the models. The training data comprises information relating to the appliance model. Thus for an input signal from an appliance, the information relating to the appliance model may comprise a vector, comprising a value of 1 for the entry corresponding to the appliance model and 0 value for the other entries. For an input signal from an appliance not on the model list, the information relating to whether the appliance corresponds to an appliance model designated as recalled may comprise a vector comprising a value of 1 for the "no match" entry, and a 0 value for the other entries. These vectors are used by the first neural network to train the weights of the neurons. The first algorithm is trained using the feature vectors and the expected output.

The method may be extended to other forms of utilities such as water and gas, where the flow and harmonics may be analysed in a similar fashion to deduce if an appliance is under recall. Similarly, the method may be extended to the analysis of auditory, gas, temperature, humidity and other sensors that may be analysed in a similar manner.

A method for identifying appliances which have been or are being recalled by the manufacturer and/or regulating body due to design, manufacturing, component and/or other defects is described. The method may monitor the energy profile of an appliance in both the time and frequency domain. The energy profile is subsequently compared to energy profiles of appliances in a recall list. The recall list contains various profiles of numerous appliance makes and models that have been extensively tested and profiled.

Further embodiments are set out in the following clauses:

1. An appliance operation signal processing system comprising:
   an input for receiving an appliance operation signal, the appliance operation signal comprising information relating to operation of an appliance;
   an output for outputting information relating to a recall status of the appliance; and
   a processor configured to:
      monitor an input appliance operation signal for a change in magnitude;
      if a change is detected:
         identify a component event corresponding to the change;
         determine whether the component event is a designated sequence start component event;
         if the component event is determined to be a designated sequence start component event:
            extract one or more features from the input appliance operation signal between the sequence start component event and a sequence stop point;
            determine a probability that the appliance corresponds to an appliance model designated as recalled, by applying a first classifier to a feature vector comprising the one or more features.

2. The system of clause 1, wherein the processor is further configured to, if the component event is determined to be a designated sequence start component event:
   monitor the input appliance operation signal for further changes in magnitude;
   identify component events corresponding to detected changes;
   wherein extracting the one or more features comprises extracting time location information, relative to the sequence start component event, for each identified component event and wherein the feature vector comprises the identified component events and the corresponding time location information.

3. The system of clause 2, wherein the time location information is relative to a start time of the sequence start component event, and wherein for each identified component event, the feature vector comprises a start time of the component event and a stop time of the component event.

4. The system of any preceding clause, wherein the first classifier is configured to determine a probability that the appliance corresponds to each of a set of appliance models designated as recalled, and wherein the processor is further configured to normalise the probabilities, determine the probability with the highest value, determine whether the probability with the highest value is greater than a threshold value, wherein if the probability with the highest value is greater than the threshold value, the appliance is identified as corresponding to an appliance model designated as recalled.

5. The system according to clause 3, wherein extracting the one or more features further comprises, for each component event:
   extracting a first section of the input signal, the first section being a section of the signal from a location prior to the start time to a location after the start time and before the end time;
   extracting a pre-component event portion of the first section, the pre-component event portion being at least a part of the first section of the signal prior to the start time;
   extracting a post-component event portion of the first section, the post-component event portion being at least a part of the first section of the signal after the start time;
   transforming each of the pre-component event portion and the post-component event portion into the frequency domain;
   subtracting the frequency domain pre-component event portion from the frequency domain post-component event portion to give a resultant frequency spectrum, wherein the feature vector further comprises information relating to the resultant frequency spectrum for each component event.

6. The system according to clause 5, wherein transforming into the frequency domain comprises using a fast Fourier transform.

7. The system according to clause 5 or 6, wherein the information relating to the resultant frequency spectrum comprises the amplitude value corresponding to a plurality of harmonic frequencies, wherein the harmonic frequencies are the positive integer multiples of the fundamental frequency of the appliance operation signal.

8. The system according to clause 3, wherein extracting the one or more features comprises, for each component event:
   extracting a first section of the input signal, the first section being a section of the signal from a location prior to the start time to a location after the start time and before the end time;
   extracting a pre-component event portion of the first section, the pre-component event portion being at least a part of the first section of the signal prior to the start time; extracting a post-component event portion of the first section, the post-component event portion being at least a part of the first section of the signal after the start time;
   subtracting the time domain pre-component event portion from the time domain post-component event portion to give a resultant time domain signal, wherein the feature vector further comprises information relating to the resultant time domain signal for each component event.

9. The system according to any of clauses 5 to 8, wherein the location prior to the start time and the location after the start time are a fixed duration before and after the start time.

10. The system according to any preceding clause, wherein monitoring the input appliance operation signal for a change in magnitude comprises monitoring for a change in magnitude greater than a threshold value.

11. The system according to any preceding clause, wherein identifying a component event corresponding to the change comprises extracting one or more features from the input appliance operation signal and applying a second classifier to a feature vector comprising the one or more features, wherein the second classifier is configured to determine a probability that the change corresponds to each of a set of component events corresponding to the appliance category type and the component event is identified as that with the highest probability.

12. The system according to any preceding clause, wherein determining whether the component event is a designated sequence start component event comprises determining whether the component event corresponds to a stored designated sequence start component event for the appliance category type.

13. The system according to any preceding clause, wherein the sequence stop point is a fixed time period after the designated sequence start component event.

14. The system according to clause 2, wherein the processor is further configured to determine whether the component event is a designated stop component event, wherein the sequence stop point corresponds to the time location of a designated stop component event.

15. The system according to any preceding clause, wherein the appliance operation signal comprises a utility consumption signal.

16. The system according to any preceding clause, wherein the appliance consumes electrical power, and wherein the appliance operation signal comprises an electrical current signal and/or an electrical voltage signal and/or an electrical power signal.

17. The system according to clause 6, wherein the appliance operation signal comprises an electrical power signal having a fundamental frequency of 50 Hz or 60 Hz.

18. The system according to any preceding clause, wherein the appliance consumes water and the appliance operation signal comprises a water consumption signal.

19. The system according to any preceding clause, wherein the appliance consumes gas and wherein the appliance operation signal comprises a gas consumption signal.

20. The system according to any preceding clause, wherein the appliance operation signal comprises an auditory signal and/or a vibratory signal.

21. The system according to any preceding clause, wherein the appliance operation signal comprises information relating to operation of a plurality of appliances, and wherein the processor is further configured to:
    if a change is detected, identify an appliance category type corresponding to the change.

22. The system according to clause 21, wherein the system is an electrical power disaggregation system configured to connect to the mains electricity supply of a premises.

23. The system according to any of clauses 1 to 20, wherein the system is a power plug for coupling an electrical appliance to an electrical power supply.

24. The system according to any of clauses 1 to 21, wherein the input is a receiver configured to receive the utility operation signal over a wired or wireless connection.

25. The system according to any preceding clause, wherein the first classifier is a machine learning classifier.

26. The system according to any preceding clause, wherein the appliance operation signal is a continuously sampled time domain signal, wherein the sampling frequency is at least 50 Hz or at least 60 Hz.

27. The system according to any preceding clause, wherein the output comprises a transmitter and the outputted recall status is transmitted over a wired or wireless connection.

28. The system according to any preceding clause, wherein the output comprises a display and the outputted recall status is displayed on the display.

29. The system according to any preceding clause, wherein the first classifier is further configured to determine a probability that the appliance corresponds to each of a set of appliance models having a failed component, wherein the appliance model is designated as recalled if the component has failed.

30. An appliance operation signal processing method comprising:
    receiving an appliance operation signal, the appliance operation signal comprising information relating to operation of an appliance;
    monitoring an input appliance operation signal for a change in magnitude;
    if a change is detected:
        identifying a component event corresponding to the change;
        determining whether the component event is a designated sequence start component event;
        if the component event is determined to be a designated sequence start component event:
            extracting one or more features from the input appliance operation signal between the sequence start component event and a sequence stop point;
            determining a probability that the appliance corresponds to an appliance model designated as recalled, by applying a first classifier to the feature vector comprising the one or more features;
            outputting information relating to a recall status of the appliance.

31. A method of training a machine learning classifier to determine a probability that an appliance corresponds to each of a set of appliance models designated as recalled, using a corpus of data comprising appliance operation signals each comprising information relating to operation of an appliance and each annotated with information relating to whether the appliance corresponds to an appliance model designated as recalled, the corpus comprising signals from a set of appliance models designated as recalled and from appliance models not designated as recalled, the method comprising:
    for each appliance operation signal, monitoring for a change in magnitude;
    if a change is detected:
        identifying a component event corresponding to the change;
        determining whether the component event is a designated sequence start component event;
        if the component event is determined to be a designated sequence start component event:
            extracting one or more features from the input appliance operation signal between the sequence start component event and a sequence stop point;
            determining a probability that the appliance corresponds to each of the set of appliance models designated as recalled, by applying the machine learning classifier to a feature vector comprising the one or more features;
    training the machine learning classifier using the annotations.

32. The method according to clause 31, wherein the corpus of data further comprises signals from appliance models having a failed component, wherein the appliance model is designated as recalled if the component has failed, and the appliance models not having the failed component, each annotated with information relating to whether the appliance corresponds to an appliance model having a failed component and is designated as recalled.

33. A method of annotating a corpus of data comprising appliance operation signals each comprising information relating to operation of an appliance with information relating to whether the appliance corresponds to an appliance model designated as recalled.

34. A carrier medium comprising computer readable code configured to cause a computer to perform the method of any of clauses 30 to 33.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. An appliance operation signal processing system comprising:
   an input for receiving an input appliance operation signal, the input appliance operation signal comprising information relating to operation of an appliance;
   an output for outputting information relating to a recall status of the appliance; and
   a processor configured to:
      monitor the input appliance operation signal for a change in magnitude;
      if the change in magnitude is detected:
         identify a component event corresponding to the change in magnitude;
         determine whether the component event is a designated sequence start component event;
         if the component event is determined to be the designated sequence start component event:
            extract one or more features from the input appliance operation signal between the designated sequence start component event and a sequence stop point;
            determine information relating to the recall status of the appliance by inputting the one or more features into a first algorithm.

2. The system of claim 1, wherein the first algorithm comprises a first classifier and wherein determining the information relating to the recall status of the appliance comprises determining a probability that the appliance corresponds to an appliance model designated as recalled, by applying the first classifier to a feature vector comprising the one or more features.

3. The system of claim 2, wherein the first classifier is configured to determine a probability that the appliance corresponds to each of a set of appliance models designated as recalled, and wherein the processor is further configured to normalise the probabilities, determine a probability of the normalized probabilities with a highest value, determine whether the probability with the highest value is greater than a threshold value, wherein if the probability with the highest value is greater than the threshold value, the appliance is identified as corresponding to an appliance model designated as recalled.

4. The system of claim 1, wherein the processor is further configured to, if the component event is determined to be the designated sequence start component event:
   monitor the input appliance operation signal for a further change in magnitude;
   identify a second component event corresponding to the further change in magnitude;
   wherein extracting the one or more features comprises:
      extracting a first time location information, relative to the designated sequence start component event, for the component event;
      extracting a second time location information, relative to the designated sequence start component event, for the second component event; and
   wherein:
      a first feature vector comprises information relating to the component event and the first time location information; and
      a second feature vector comprises information relating to the second component event and the second time location information.

5. The system of claim 4, wherein:
   the first time location information and the second time location information are relative to a start time of the designated sequence start component event, and wherein:
      the first feature vector comprises a start time of the component event and a stop time of the component event; and
      the second feature vector comprises a second start time of the second component event and a second stop time of the second component event.

6. The system according to claim 5, wherein extracting the one or more features further comprises, for the component event:
   extracting a first section of the input appliance operation signal, the first section being a section of the input appliance operation signal from a location prior to the start time of the component event to a location after the start time of the component event and before an end time of the component event;
   extracting a pre-component event portion of the first section, the pre-component event portion being at least a part of the first section of the input appliance operation signal prior to the start time of the component event;
   extracting a post-component event portion of the first section, the post-component event portion being at least a part of the first section of the input appliance operation signal after the start time of the component event;
   transforming the pre-component event portion and the post-component event portion into a frequency domain;
   subtracting the frequency domain pre-component event portion from the frequency domain post-component event portion to give a resultant frequency spectrum, wherein the first feature vector further comprises information relating to the resultant frequency spectrum for the component event.

7. The system according to claim 6, wherein the information relating to the resultant frequency spectrum for the component event comprises a plurality of amplitude values, wherein each amplitude value in the plurality of amplitude values corresponds to a harmonic frequency in a plurality of harmonic frequencies, wherein the plurality of harmonic frequencies are positive integers multiples of a fundamental frequency of the input appliance operation signal.

8. The system according to claim 4, wherein the processor is further configured to determine whether the component event is a designated stop component event, wherein the sequence stop point corresponds to a time location of a designated stop component event.

9. The system according to claim 1, wherein identifying the component event corresponding to the change in magnitude comprises:
   extracting a second feature from the input appliance operation signal; and
   applying a second classifier to a feature vector comprising the second feature, wherein the second classifier is configured to determine:
      a first probability that the change in magnitude corresponds to a first component event corresponding to an appliance category type; and
      a second probability that the change in magnitude corresponds to a second component event corresponding to the appliance category type; and
   the component event is identified as the first component event responsive to determining that the first probability is higher than the second probability.

10. The system according to claim 1, wherein the sequence stop point is a fixed time period after the designated sequence start component event.

11. An appliance operation signal processing method comprising:
    receiving an input appliance operation signal, the input appliance operation signal comprising information relating to operation of an appliance;
    monitoring the input appliance operation signal for a change in magnitude;
    if the change in magnitude is detected:
        identifying a component event corresponding to the change in magnitude;
        determining whether the component event is a designated sequence start component event;
        if the component event is determined to be the designated sequence start component event:
            extracting one or more features from the input appliance operation signal between the designated sequence start component event and a sequence stop point;
            determining information relating to a recall status of the appliance by inputting the one or more features into a first algorithm;
            outputting information relating to the recall status of the appliance.

12. The method according to claim 11, wherein the first algorithm comprises a first classifier and wherein determining information relating to the recall status of the appliance by inputting the one or more features into the first algorithm comprises determining a probability that the appliance corresponds to an appliance model designated as recalled, by applying the first classifier to a feature vector comprising the one or more features.

13. A non-transitory computer readable medium comprising computer readable code configured to cause a computer to perform the method of claim 11.

* * * * *